United States Patent [19]
Jones et al.

[11] Patent Number: 4,635,475
[45] Date of Patent: Jan. 13, 1987

[54] HOT ELEMENT MASS AIRFLOW SENSOR

[75] Inventors: Gregory S. Jones, Cape Canaveral, Fla.; William H. Steele, Flushing; Glenn A. Gurtcheff, Grand Blanc, both of Mich.

[73] Assignee: General Motors Corporation, Detroit, Mich.

[21] Appl. No.: 793,214

[22] Filed: Oct. 31, 1985

[51] Int. Cl.$^4$ .............................................. G01F 1/68
[52] U.S. Cl. ..................................... 73/204; 73/118.2
[58] Field of Search ................................ 73/118, 204

[56] References Cited

U.S. PATENT DOCUMENTS 4,264,961 4/1981 Nishimura et al. .................... 73/204
4,373,387 2/1983 Nishimura et al. .................... 73/204
4,433,576 2/1984 Shih et al. ............................. 73/204
4,474,058 10/1984 Drews et al. .......................... 73/204

FOREIGN PATENT DOCUMENTS 0574675 9/1977 U.S.S.R. ................................. 73/204

OTHER PUBLICATIONS

Martino et al., "A Thermistor Anemometer for the Measurement of Very Low Air Velocities", 1971, The Review of Scientific Instruments, vol. 42, No. 5, pp. 606–609.

Primary Examiner—Stewart J. Levy
Assistant Examiner—Robert R. Raevis
Attorney, Agent, or Firm—Warren D. Hill

[57] ABSTRACT

To reduce the temperature compensation error of a hot element mass airflow sensor due to thermal radiation losses, the element is coated with a low emissivity material. In the case of a hot film sensor which comprises a thin metal foil resistor sandwiched between polymer layers, the outer surface is covered with a low emissivity coating comprising a thin metal layer which is highly reflective to infrared radiation. A circuit supplies energy to the element to heat it to a prescribed temperature; the power required to maintain that temperature correlates with the rate of convective energy loss to the airflow and thus to the rate of mass airflow.

3 Claims, 4 Drawing Figures

U.S. Patent  Jan. 13, 1987  4,635,475
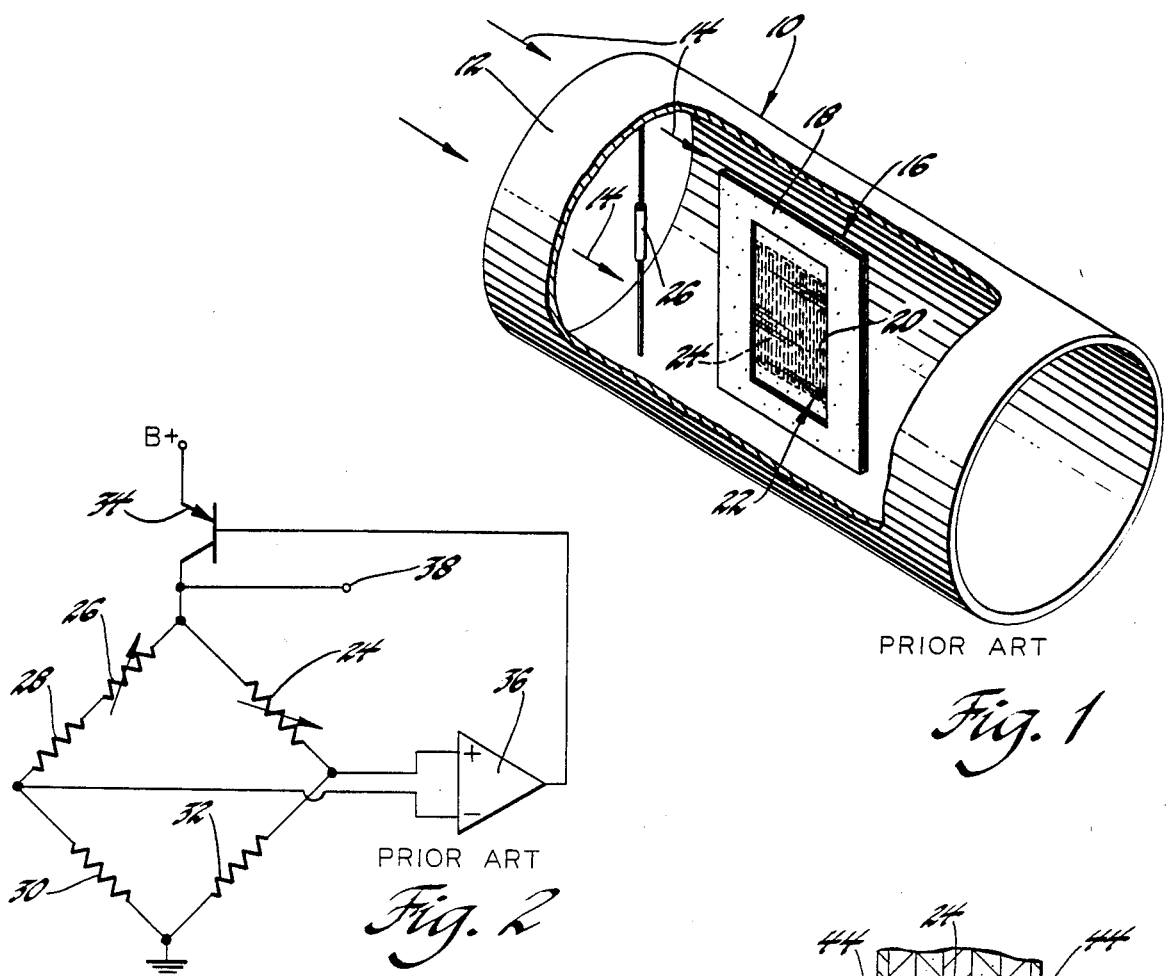
Fig. 1 PRIOR ART
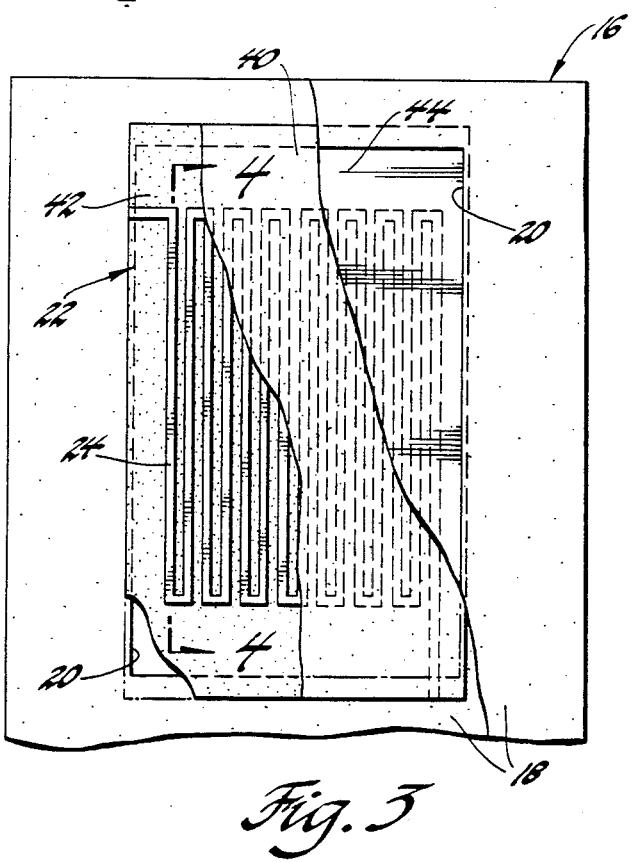
Fig. 2 PRIOR ART
Fig. 3
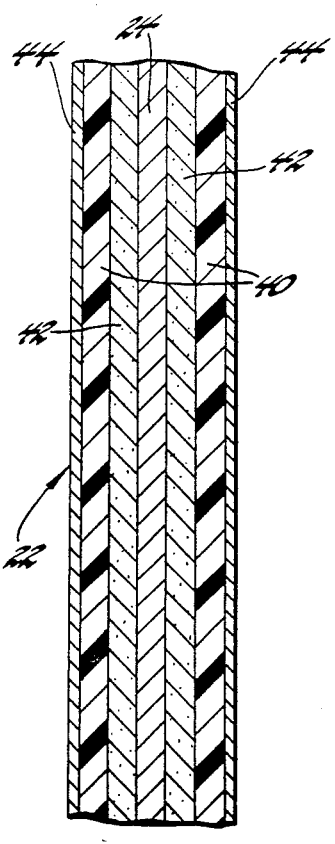
Fig. 4

HOT ELEMENT MASS AIRFLOW SENSOR

FIELD OF THE INVENTION

This invention relates to mass airflow measuring devices and more particularly to such devices of the hot element type.

BACKGROUND OF THE INVENTION

It is desirable in many applications, for example, in fuel control for automotive engines to accurately measure the mass airflow rate of a stream of air. A particular arrangement for making such a measurement utilizes a hot wire or a hot film subject to the air stream. An example of a hot film apparatus is shown in the U.S. patent to Shih et al. U.S. Pat. No. 4,433,576. In operation an element which comprises an electrical resistor or which contains a resistor is electrically heated to a temperature higher than the ambient, which temperature is constant for a given ambient air temperature. The cooling effect of the air stream on the hot element is a function of the mass airflow rate past the element. Since the cooling effect depends upon the ambient temperature as well as the difference between the element temperature and the ambient temperature, it is common practice to utilize a compensating circuit containing a reference temperature sensor to accurately compensate for temperature changes. In this manner the heat transfer rate from the hot element by convection very accurately correlates to the mass airflow rate. This value is measured by maintaining the element at the prescribed temperature by electrically heating the element and measuring the power required for such maintenance. It is assumed that the maintenance power is equal to that lost by thermal convection. That assumption, however, introduces an error since another mechanism for energy transfer from the hot element is radiation loss to cooler surroundings. The radiation loss is independent of airflow and at high airflow rates is insignificant. When, however, low airflow rates are being measured the component of thermal loss by radiation can be a significant portion of the total thereby introducing an undesirable error into the airflow measurement.

The net radiated power from a surface can be approximated by the equation $Q = \epsilon \sigma A(T_s^4 - T_a^4)$ where $\epsilon$ is the emissivity of the surface, $\sigma$ is the Stefan-Boltzman constant, A is the area of the heated surface, $T_s$ is the surface temperature and $T_a$ is the ambient temperature. From this equation it can be seen that the net radiated power Q which represents an error in the airflow measurement can be minimized by minimizing the emissivity of the surface.

SUMMARY OF THE INVENTION

It is therefore an object of the invention to provide a hot element mass airflow sensor with an element having minimal thermal loss by radiation.

The invention is carried out by a mass airflow sensor having a heated element subject to heat loss by convection and radiation including a resistive element positioned in an air stream, a circuit for electrically heating the element to a prescribed operating temperature and maintaining heat input at a rate equal to heat loss at operating temperature, and a low emissivity coating on the element for minimizing the heat loss by radiation to minimize errors in mass airflow measurement due to radiation.

BRIEF DESCRIPTION OF THE DRAWINGS

The above and other advantages of the invention will become more apparent from the following description taken in conjunction with the accompanying drawings wherein like reference numerals refer to like parts and wherein:

FIG. 1 is a partly broken away view of a mass airflow apparatus according to the prior art;

FIG. 2 is a diagram of a prior art circuit for heating the sensor element and measuring the mass airflow, FIG. 3 is a partly broken away front view of a heated sensor element according to the invention; and FIG. 4 is a cross-sectional view of the heated sensor element taken along lines 4—4 of FIG. 3.

DESCRIPTION OF THE PREFERRED EMBODIMENT

Referring to FIG. 1, a typical hot film type mass airflow sensor 10 comprises a tube 12 carrying a stream of air as indicated by the arrows 14 and containing a sensor assembly 16 comprising a planar frame or mount 18 disposed along a diameter of the tube 12 with its plane parallel to the direction of the airflow, and an aperture 20 in the frame 18 containing a composite foil 22 carrying a resistive element 24. An air temperature compensating resistor 26 is mounted upstream of the frame 18 in the plane thereof.

FIG. 2 illustrates a typical mass airflow measuring circuit which includes a bridge having in one arm resistive element 24 and in an opposite arm the compensating resistor 26, both of which change in resistive value according to temperature. An error compensation resistor 28 is serially connected to the air temperature compensation resistor 26. The respective arms of the bridge contain resistors 30 and 32. The junction point of the latter resistors is grounded, whereas the junction point of the resistors 24 and 26 is connected through a transistor 34 to a power supply conductor B+. The mid points of the bridge arms are connected to the inputs of a high gain amplifier 36, the output of which is coupled to the base of the transistor 34. The circuit values are so selected that in operation the bridge will be balanced whenever the temperature of the resistive element 24 is a prescribed amount above the air temperature as sensed by the resistor 26. The amount of the temperature difference must vary according to the air temperature since the thermal properties of the air change with temperature and this influences the cooling effect of the air stream on the resistor element 24. The temperature error compensation resistor 28 compensates for that change of thermal properties of air so that the effect of temperature change on convective heat loss from element 24 is compensated for quite accurately, although radiation heat losses are not taken into account. The current flow through the transistor 34 to the bridge is controlled by the amplifier 36 to maintain the bridge in substantially a balanced condition so that large mass airflow rates which produce a large cooling effect on the resistor element 24 will result in a large current supplied to the bridge to supply just enough heat energy to the element 24 to maintain its prescribed temperature. For low airflow rates, low current flow to the bridge suffices to maintain the balance. The bridge current flow is indirectly measured as the voltage across the bridge which appears between the output terminal 38 and ground. Thus the voltage at output terminal 38 is a function of the energy dissipated by the resistive element 24 and thus can be used as a measure of the mass airflow rate as is well known in the prior art.

A factor other than the airflow rate which influences the amount of energy dissipated by the element 24 is heat loss by radiation. This heat loss is determined by the temperature and emissivity of the foil 22 containing the resistive element 24 as well as that of surrounding surfaces, chiefly the interior walls of the tube 12. According to this invention, the net radiated power from the foil is minimized in order to minimize the thermal radiation error. To achieve this three conditions must be satisfied. First, the emissivity of the foil 22 must be as low as possible to eliminate as much radiation as possible. Second, where the heated foil is a composite structure, the surface material which is provided to minimize the emissivity of the foil must also reflect or absorb radiation from the internal elements of the foil; that is, the low emissivity material must not be transparent, else radiation loss could occur in spite of it. Third, the surface material must maintain its low emissivity regardless of temperature variations and operating conditions. Therefore, the material must be resistant to oxidation, abrasion and dust adhesion.

These three requirements can be met by applying a shiny metal to the surface of the composite foil 22. Most shiny or polished metals will have a very low emissivity, typically in the range of 0 to 0.1. Also metals are extremely good reflectors in the infrared spectrum which encompasses most of the radiated power in the operating temperature ranges of the mass airflow sensor. A thin metal coating will effectively shield the interior radiation since the infrared transmittance is near zero. Such a thin coating does not add substantial thermal mass to the element or significantly reduce time response.

As shown in FIGS. 3 and 4, a composite foil 22 mounted in a frame 18 comprises a resistive element 24 sandwiched between a pair of polymer sheets 40. The resistive element 24 is a thin nickel layer formed in a serpentine pattern having sufficient length to achieve the desired resistance and to distribute the dissipated heat over a large area of the foil. The polymer sheets 40 preferably comprise an aromatic polyimide such as Kapton (trademark) and are secured by adhesive 42 to the element 24 or to each other in the absence of the element. A metalized coating 44 covers the outer surfaces of the polymer sheets 40. The metalization is accomplished, for example, by sputtering onto the polymer sheets a layer of metal such as gold, nickel, or aluminum, about 500-4000 angstroms thick. This will effectively reduce radiation from the foil and improve temperature compensation performance. The optimum thickness of the metal is partially determined by the material used. It must be thick enough to be effectively opaque to infrared radiation without reducing the element surface temperature or slowing its response time. Also the material must adhere well to the foil since thermal cycling is present and any differences in thermal expansion coefficients will become important.

It will thus be seen that in mass airflow sensors of the hot element type which are used in applications subject to significant variations of air temperature, thermal loss by radiation represents a significant source of temperature error, particularly at low flow rates. The treatment of the element to provide a low emissivity surface enhances the accuracy of such a meter by reducing the errors introduced by thermal radiation.

The embodiments of the invention in which an exclusive property or privilege is claimed are defined as follows:

1. A mass airflow sensor having a heated element subject to heat loss by convection and radiation wherein the rate of heat loss by convection is a measure of mass airflow and the rate of heat loss by radiation introduces error into airflow measurement, the heated element including;

a resistive element positioned in an airstream;

a circuit for electrically heating the element to a prescribed operating temperature and maintaining heat input at a rate equal to heat loss at the operating temperature, such rate being useful as a measure of mass airflow; and means for minimizing the heat loss by radiation comprising a low emissivity coating on the element whereby any error in mass airflow measurement is also minimized.

2. A mass airflow sensor as described in claim 1 wherein the resistive element is a composite foil including a resistor covered by insulating layers and the low emissivity coating on the element is an outer layer on the composite foil comprising a material highly reflective to infrared radiation.

3. A mass airflow sensor as described in claim 1 wherein the resistive element is a thin resistive layer encapsulated between two polymer films and the low emissivity coating is a metallic layer covering the polymer films.

* * * * *